United States Patent
Freeman et al.

(10) Patent No.: US 9,157,447 B2
(45) Date of Patent: Oct. 13, 2015

(54) CENTRIFUGAL GAS COMPRESSOR MAGNETIC BEARING THRUST COLLAR WITH MOUNTING PILOTS

(71) Applicant: Solar Turbines Incorporated, San Diego, CA (US)

(72) Inventors: Jess Lee Freeman, Poway, CA (US); William Courtney Krehbiel, San Marcos, CA (US)

(73) Assignee: Solar Turbines Incorporated, San Diego, CA (US)

( * ) Notice: Subject to any disclaimer, the term of this patent is extended or adjusted under 35 U.S.C. 154(b) by 538 days.

(21) Appl. No.: 13/656,333

(22) Filed: Oct. 19, 2012

(65) Prior Publication Data

US 2014/0112774 A1    Apr. 24, 2014

(51) Int. Cl.
  F04D 29/058    (2006.01)
  F04D 29/051    (2006.01)
  F16C 32/04     (2006.01)
  F04D 29/059    (2006.01)
  F04D 29/62     (2006.01)

(52) U.S. Cl.
  CPC ............ F04D 29/051 (2013.01); F04D 29/058 (2013.01); F04D 29/059 (2013.01); F04D 29/624 (2013.01); F16C 32/0476 (2013.01)

(58) Field of Classification Search
  None
  See application file for complete search history.

(56) References Cited

U.S. PATENT DOCUMENTS

| | | | |
|---|---|---|---|
| 4,935,654 A * | 6/1990 | Glass et al. | 310/90.5 |
| 4,948,348 A | 8/1990 | Doll et al. | |
| 5,455,472 A * | 10/1995 | Weiss et al. | 310/90.5 |
| 5,572,119 A | 11/1996 | Taylor | |
| 6,987,339 B2 | 1/2006 | Adams et al. | |
| 7,723,883 B2 * | 5/2010 | Ozaki et al. | 310/90.5 |
| 7,884,521 B2 * | 2/2011 | Buhler et al. | 310/216.121 |
| 2011/0085753 A1 | 4/2011 | Tecza | |

OTHER PUBLICATIONS

Sears et al. "Magnetic Bearing Operating Experience." Proceedings of the Twenty-Third Turbomachinery Symposium. 1994. pp. 235-242.
Tessier. "The Development of an Auxiliary Bearing Landing System for a Flexible AMB-Supported Hydrogen Process Compressor Rotor." Proceedings of Mag '97, Industrial Conference and Exhibition on Magnetic Bearings. Aug. 21-22, 1997. pp. 120-128.
Barbey et al. "SKF Response to Solar AMB Patent Applications." Jul. 29, 2014, 8 pages.
Schweitzer et al. "Magnetic Bearings: Theory, Design, and Application to Rotating Machinery." 2009. Section 13.5: Design Considerations (pp. 401-404).

* cited by examiner

*Primary Examiner* — Dwayne J White
*Assistant Examiner* — Justin Seabe
(74) *Attorney, Agent, or Firm* — Procopio, Cory, Hargreaves & Savitch LLP

(57) ABSTRACT

A thrust collar (161) includes a central disk (162), a forward wing (163), and an aft wing (164). The central disk (162) is a disk shaped hollow cylinder with a central axis (97). The forward wing (163) and the aft wing (164) are thin walled hollow cylinders extending axially from an inner portion of the central disk (162) about the central axis (97) in opposite directions. The forward wing (163) includes a forward mounting pilot (165) extending radially inward from the forward wing (163) distal to the central disk (162). The aft wing (164) includes an aft mounting pilot (167) extending radially inward from the aft wing (164) distal to the central disk (162).

20 Claims, 3 Drawing Sheets

CENTRIFUGAL GAS COMPRESSOR MAGNETIC BEARING THRUST COLLAR WITH MOUNTING PILOTS

TECHNICAL FIELD

The present disclosure generally pertains to centrifugal gas compressors, and is more particularly directed toward centrifugal gas compressor magnetic bearing thrust disk with mounting pilots.

BACKGROUND

The use of magnetic bearings in rotary machines such as centrifugal gas compressors is increasing. Magnetic bearings work on the principle of electromagnetism. The use of electromagnetism in centrifugal gas compressor bearings reduces or eliminates friction losses in centrifugal gas compressors.

Magnetic bearings in rotary machines are generally arranged with multiple windings or electric coils surrounding a shaft formed from a ferromagnetic material. Some magnetic bearings use a ferromagnetic lamination for the radial bearings and a ferromagnetic thrust disk or thrust collar for the thrust bearings. The windings or coils in a radial magnetic bearing radially surround the shaft and produce a magnetic field that tends to attract or repel the rotor shaft. The windings or coils in a thrust magnetic bearing produces a magnetic field that tends to attract or repel a thrust collar attached to the shaft to counteract axial forces. The attractive forces of the windings or coils may be controlled by varying the current in each winding or coil. Magnetic bearing thrust collars may require a larger outer diameter than the outer diameter of a mechanical bearing thrust collar to match the load capacity of the mechanical bearing thrust collar.

U.S. Pat. No. 4,948,348 to R. Doll discloses an immersion pump, especially for low-boiling fluids, having a support for a shaft and a ferromagnetic impeller wheel mounted to the shaft. The support includes at least one controllable electromagnet that operates to axially support and position the impeller wheel.

The present disclosure is directed toward overcoming one or more of the problems discovered by the inventors.

SUMMARY OF THE DISCLOSURE

A centrifugal gas compressor magnetic bearing thrust collar includes a central disk, a forward wing, and an aft wing. The central disk is a disk shaped hollow cylinder with a central axis. The forward wing is a thin walled hollow cylinder extending axially from an inner portion of the central disk about the central axis. The forward wing includes a forward mounting pilot extending radially inward from the forward wing proximal an end of the forward wing distal to the central disk. The aft wing is a thin walled hollow cylinder extending axially from the inner portion of the central disk about the central axis in a direction opposite the forward wing. The aft wing includes an aft mounting pilot extending radially inward from the aft wing proximal an end of the aft wing distal to the central disk.

DETAILED DESCRIPTION

The systems and methods disclosed herein include a magnetic bearing thrust collar of a centrifugal gas compressor magnetic bearing. In embodiments, the thrust collar may be configured with axial wings extending from a central disk. The axial wings include mounting pilots at distal ends of the axial wings. Thermally mounting a magnetic bearing thrust collar with axial wings and mounting pilots may reduce the stresses associated with the installation of mounting magnetic bearing thrust collars onto a centrifugal gas compressor shaft.

Figure 1:
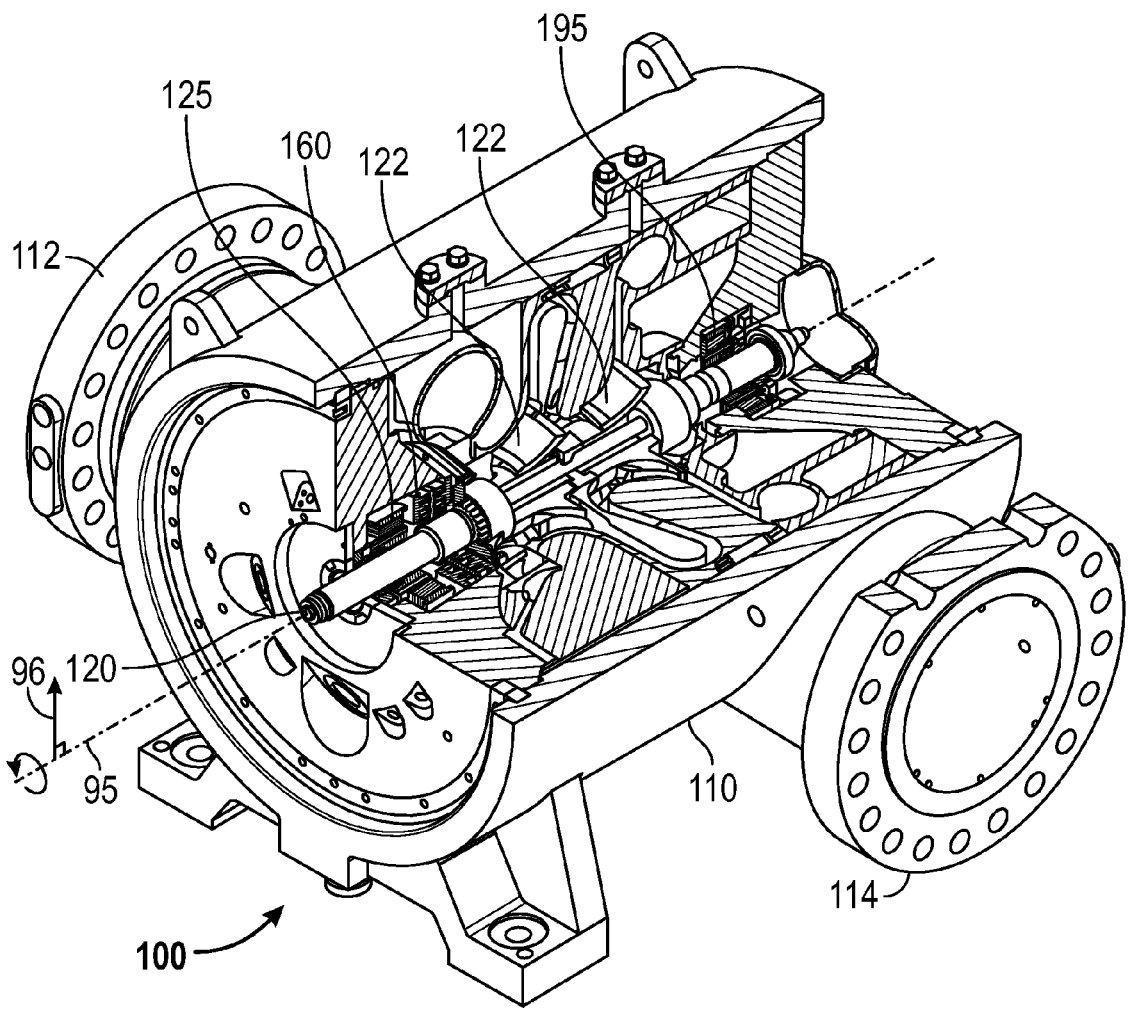
FIG. 1 is a cutaway illustration of an exemplary centrifugal gas compressor.

FIG. 1 is a cutaway illustration of an exemplary centrifugal gas compressor 100. Some of the surfaces have been left out or exaggerated (here and in other figures) for clarity and ease of explanation. Also, the disclosure may reference a forward and an aft direction. Generally, all references to "forward" and "aft" are associated with the flow direction of the compressed gas with the suction end of the centrifugal gas compressor being considered the forward end and the discharge end being considered the aft end, unless specified otherwise.

In addition, the disclosure may generally reference a center axis 95 of rotation of the centrifugal gas compressor, which may be generally defined by the longitudinal axis of its shaft 120. The center axis 95 may be common to or shared with various other concentric components of the centrifugal gas compressor. All references to radial, axial, and circumferential directions and measures refer to center axis 95, unless specified otherwise, and terms such as "inner" and "outer" generally indicate a lesser or greater radial distance from the center axis 95, wherein a radial 96 may be in any direction perpendicular and radiating outward from center axis 95.

Centrifugal gas compressor 100 includes housing 110, suction port 112, discharge port 114, centrifugal impellers 122, shaft 120, and a bearing system. Process gas enters the centrifugal gas compressor 100 at a suction port 112 formed on a housing 110. The process gas is compressed by one or more centrifugal impellers 122 mounted to a shaft 120. The compressed process gas exits the centrifugal gas compressor 100 at a discharge port 114 that is formed on the housing 110. Shaft 120 may include a suction end and a discharge end. Shaft 120 may be a single shaft or dual shaft configuration. In a dual shaft configuration, shaft 120 may include a suction end stubshaft and a discharge end stubshaft.

Shaft 120 and attached elements may be supported by the bearing system. The bearing system may include suction end radial bearing 125, discharge end radial bearing 195, thrust bearing 160, and an auxiliary bearing system. Suction end radial bearing 125 and discharge end radial bearing 195 support axial ends of shaft 120. Thrust bearing 160 counteracts axial forces applied to shaft 120. In the embodiment shown, suction end radial bearing 125, discharge end radial bearing 195, and thrust bearing 160 are magnetic bearings.

Figure 2:
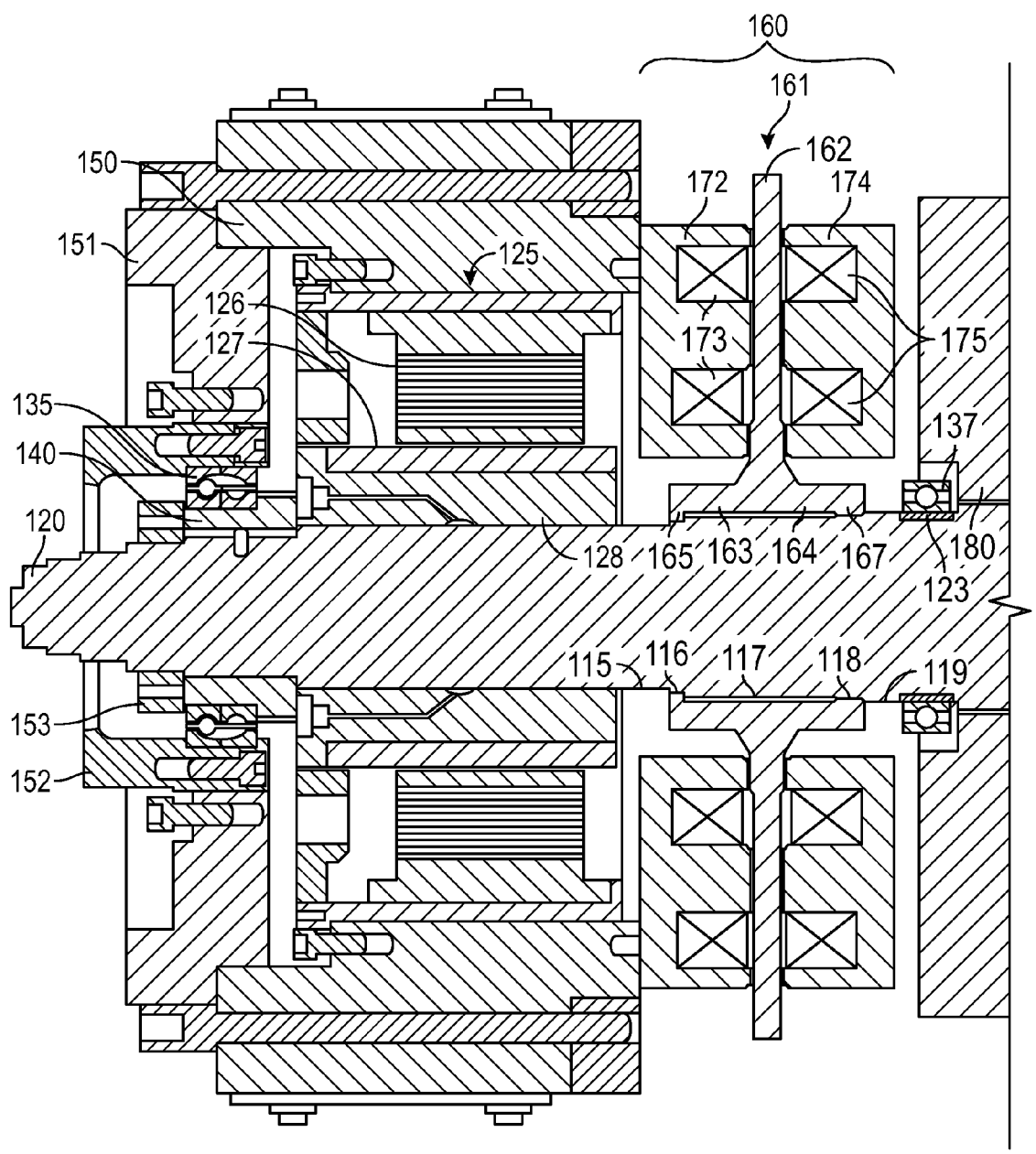
FIG. 2 is a cross-sectional view of a suction end of the centrifugal gas compressor of FIG. 1 including a magnetic bearing with a thrust collar.

FIG. 2 is a partial cross-sectional view of the suction end of the centrifugal gas compressor 100. In particular, the suction end of the centrifugal gas compressor 100 schematically illustrated in FIG. 1 is shown here in greater detail, including suction end radial bearing 125, thrust bearing 160, and portions of the auxiliary bearing system.

In the embodiment depicted in FIG. 2, suction end radial bearing 125 is located proximal the forward end of shaft 120. Suction end radial bearing 125 may include suction end lamination sleeve 128, suction end lamination 127, and suction end windings 126. Suction end lamination sleeve 128 may be installed onto shaft 120 with an interference fit. Generally suction end lamination sleeve 128 will not include ferromagnetic materials.

Suction end lamination 127 is located radially outward from suction end lamination sleeve 128. Suction end lamination 127 is attached or coupled to suction end lamination sleeve 128 at an outer surface of suction end lamination sleeve 128. Suction end lamination 127 includes ferromagnetic materials.

Suction end windings 126 are located radially outward from suction end lamination 127 and are axially aligned with suction end lamination 127. Suction end windings 126 and suction end lamination 127 are configured with a radial clearance there between. Suction end windings 126 may be circumscribed by endcap 150. Discharge end radial bearing 195 may have a similar structure as the described structure of suction end radial bearing 125.

Shaft 120 may include first region 115, second region 116, third region 117, fourth region 118, and fifth region 119. First region 115 may be axially forward of second region 116; second region 116 may be axially forward of third region 117; third region 117 may be axially forward of fourth region 118; and fourth region 118 may be axially forward of fifth region 119. The outside diameter of shaft 120 may include a first step, a second step, a third step and a fourth step. The first step is between first region 115 and second region 116 and the outside diameter of shaft 120 may increase from first region 115 to second region 116. The second step is between second region 116 and third region 117 and the outside diameter of shaft 120 may increase from second region 116 to third region 117. The third step is between third region 117 and fourth region 118 and the outside diameter of shaft 120 may increase from third region 117 to fourth region 118. The fourth step is between fourth region 118 and fifth region 119 and the outside diameter of shaft 120 may increase from fourth region 118 to fifth region 119.

In the embodiment depicted in FIG. 2, thrust bearing 160 is located axially aft of and proximal suction end radial bearing 125. However, thrust bearing 160 may be located at any axial position of shaft 120. Thrust bearing 160 includes thrust collar 161, forward bearing pole 172, and aft bearing pole 174. Thrust collar 161 is located radially outward from shaft 120 and may be installed on shaft 120 with an interference fit. In one embodiment thrust collar 161 is thermally installed onto shaft 120.

Figure 3:
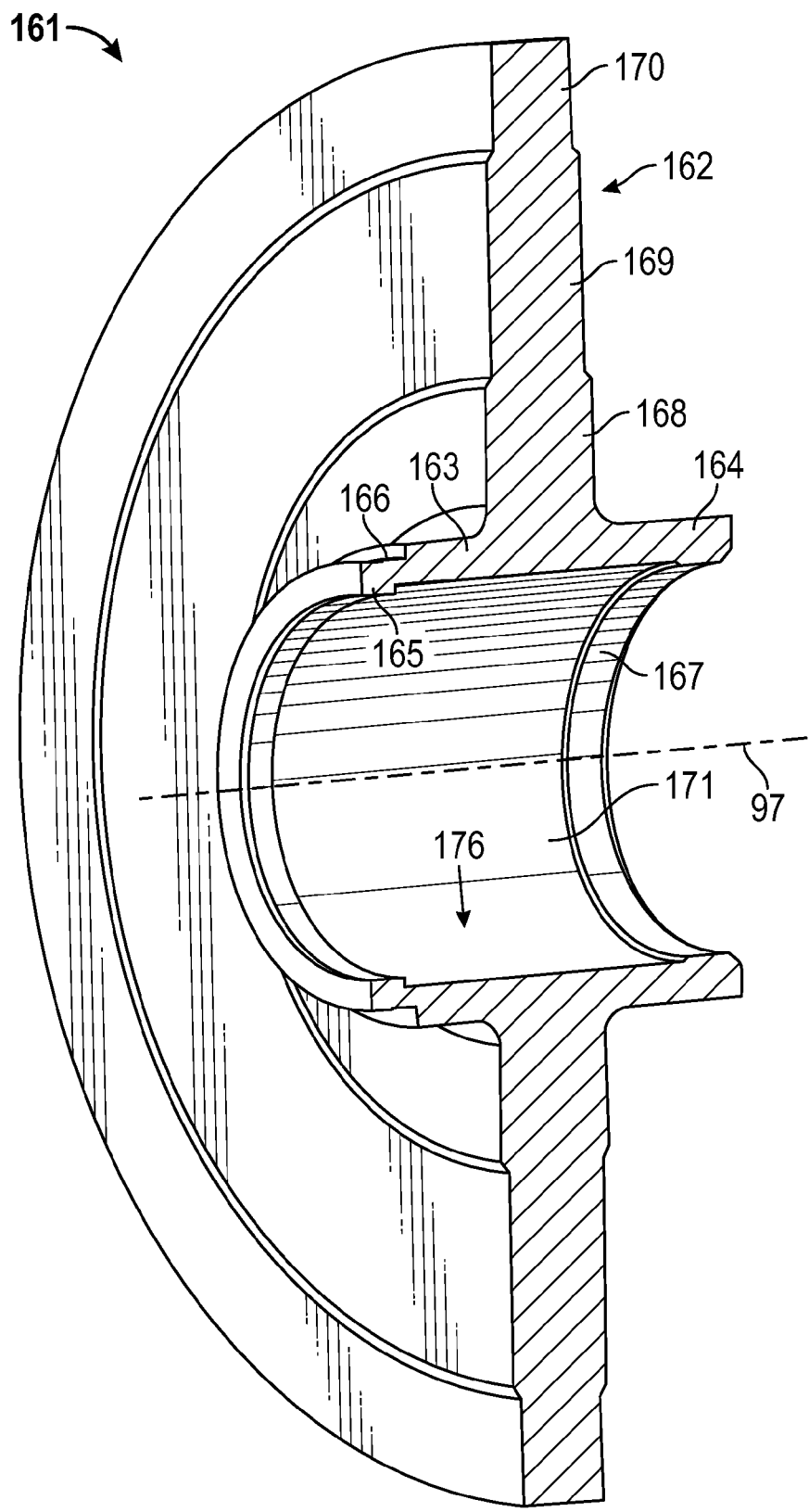
FIG. 3 is a perspective view of the magnetic bearing thrust collar of FIG. 2 cut on a plane passing through the center axis to show the cross-section of the magnetic bearing thrust collar.

FIG. 3 is a perspective view of the magnetic bearing thrust collar 161 of FIG. 2. All references to radial, axial, and circumferential directions and measures for elements of thrust collar 161 refer to the axis of thrust collar 161, which is concentric to center axis 95. Referring now to FIGS. 2 & 3, thrust collar 161 includes central disk 162, forward wing 163, and aft wing 164. Central disk 162 is a disk shaped hollow cylinder. The disk shape includes an outer diameter and an inner diameter defining a radial thickness of central disk 162 there between. In one embodiment, central disk 162 has an axial thickness that is at least two times smaller than the radial thickness. Central disk 162 may include central axis 97 concentric to the axis of thrust collar 161.

Forward wing 163 extends axially from an inner portion of central disk 162, proximal the inner diameter. Forward wing 163 may extend axially about central axis 97. In the embodiment shown in FIG. 2, forward wing 163 extends axially forward. Forward wing 163 may be a thin walled hollow cylinder coaxial to central disk 162.

Aft wing 164 extends axially from an inner portion of central disk 162, proximal the inner diameter, in a direction opposite forward wing 163. Aft wing 164 may extend axially about central axis 97. In the embodiment shown in FIG. 2, aft wing 164 extends axially aft. Aft wing 164 may be a thin walled hollow cylinder coaxial to central disk 162 and forward wing 163. The hollow cylindrical shapes of central disk 162, forward wing 163, and aft wing 164 may be configured to form shaft cavity 171. Shaft cavity 171 may be coaxial to central disk 162 and may extend along central axis 97. Shaft cavity 171 may include inner surface 176, the inward facing surface of shaft cavity 171. In the embodiment shown in FIG. 2, the diameter of shaft cavity 171 is slightly larger than the diameter of shaft 120 at region 115 forming an annular gap between shaft 120 and inner surface 176.

Forward wing 163 includes forward mounting pilot 165. Forward mounting pilot 165 extends radially inward from forward wing 163 proximal to the end of forward wing 163 distal to central disk 162. Forward mounting pilot 165 may extend from forward wing 163 in the form of a ring. Forward mounting pilot 165 may protrude beyond inner surface 176. In the embodiment shown in FIG. 2, forward mounting pilot 165 extends radially inward from the forward end of forward wing 163 and is axially aligned with second region 116 when thrust collar 161 is installed. The first step may be axially forward of forward mounting pilot 165 and the second step may be axially aft of forward mounting pilot 165. The inner diameter of forward mounting pilot 165 may be larger than first region 115. The radially inner surface of forward mounting pilot 165 contacts shaft 120 at second region 116 with an interference fit.

Aft wing 164 includes aft mounting pilot 167. Aft mounting pilot 167 extends radially inward from aft wing 164 proximal to the end of aft wing 164 distal to central disk 162. Aft mounting pilot 167 may extend from aft wing 164 in the form of a ring. Aft mounting pilot 167 may protrude beyond inner surface 176. In the embodiment shown in FIG. 2, aft mounting pilot 167 extends radially inward from the aft end of aft wing 164 and is axially aligned with fourth region 118 when thrust collar 161 is installed. The third step may be axially forward of aft mounting pilot 167 and the fourth step may be axially aft of aft mounting pilot 167. The radially inner surface of aft mounting pilot 167 contacts shaft 120 at fourth region 118 with an interference fit.

Referring now to FIG. 3, forward wing 163 may include threaded region 166 (not shown in the embodiment of FIG. 2). Threaded region 166 is located at an outer surface of forward wing 163 and distal to central disk 162. Threaded region 166 is threaded. In the embodiment shown in FIG. 3, threaded region 166 is located at the forward end of forward wing 163 radially outward from forward mounting pilot 165 at the outer surface of forward wing 163. The outer diameter of threaded region 166 may be smaller than the outer diameter of the remainder of forward wing 163.

Central disk 162 may include multiple axial thicknesses. The axial thicknesses may be formed by first disk portion 168, second disk portion 169, and third disk portion 170. First disk portion 168 may be the radially inner portion of central disk 162. Second disk portion 169 may be the radial middle portion of central disk 162. Third disk portion 170 may be the radially outer portion of central disk 162. First disk portion 168 may have an axial thickness greater than second disk portion 169 and third disk portion 170. Second disk portion 169 may have an axial thickness greater than third disk portion 170. Thrust collar 161 may be a single piece forging including central disk 162, forward wing 163, and aft wing 164.

Referring again to FIG. 2, forward bearing pole 172 is located axially forward of central disk 162 with a forward axial clearance there between and radially aligned with at least a portion of central disk 162. Forward bearing pole 172 is also located radially outward from forward wing 163 with a forward radial clearance there between and at least partially axially aligned with forward wing 163. Forward bearing pole 172 includes one or more forward circumferential slots 173 filled with magnetic coils. Each forward circumferential slot 173 is proximal central disk 162.

Aft bearing pole 174 is located axially aft of central disk 162 with an aft axial clearance there between and radially aligned with at least a portion of central disk 162. Aft bearing pole 174 is also located radially outward from aft wing 164 with an aft radial clearance there between and at least partially axially aligned with aft wing 164. Aft bearing pole 174 may also be radially aligned with forward bearing pole 172. Aft bearing pole 174 includes on or more aft circumferential slots 175 filled with magnetic coils. Each aft circumferential slot 175 is proximal central disk 162. Central disk 162 may be axially between forward bearing pole 172 and aft bearing pole 174.

The auxiliary bearing system may include central auxiliary bearing 137, hardened surface 123, suction end auxiliary bearing 135, and suction end landing guard 140. Central auxiliary bearing 137 may be located between the suction end and the discharge end of shaft 120. In the embodiment depicted if FIG. 2, central auxiliary bearing 137 is located axially aft of thrust bearing 160.

Central auxiliary bearing 137 is located radially outward from shaft 120. Central auxiliary bearing 137 and shaft 120 are configured with a radial clearance there between. As part of the auxiliary bearing system, shaft 120 includes hardened surface 123. Hardened surface 123 is an annular portion of the surface of shaft 120 axially aligned with central auxiliary bearing 137.

Suction end auxiliary bearing 135 may be located axially forward of suction end radial bearing 125. Suction end auxiliary bearing 135 may comprise multiple bearings. In one embodiment, suction end auxiliary bearing 135 includes a tandem pair of bearings.

Suction end landing guard 140 is installed onto shaft 120 between suction end auxiliary bearing 135 and shaft 120. Suction end auxiliary bearing 135 is located radially outward from suction end landing guard 140 with a radial clearance there between. Suction end landing guard may have an L-shaped cross section.

The centrifugal gas compressor 100 may also include endcaps 151, 152, and 152, as well as separation seal 180. Endcaps 151, 152, and 153 may be installed at the forward end of the centrifugal gas compressor 100. Endcap 153 is located forward of suction end landing guard 140 and radially outward from shaft 120. Endcap 152 axially overlaps with suction end landing guard 140 and is located radially outward from endcap 153 and suction end landing guard 140. Endcap 151 is located forward of suction end windings 126 and radially outward from endcap 152. Separation seal 180 may be located axially aft of thrust bearing 160 and central auxiliary bearing 137.

INDUSTRIAL APPLICABILITY

Centrifugal gas compressors are used to move process gas from one location to another. Centrifugal gas compressors are often used in the oil and gas industries to move natural gas in a processing plant or in a pipeline. Centrifugal gas compressors are driven by gas turbine engines, electric motors, or any other power source.

There is a desire to achieve greater efficiencies and reduce emissions in large industrial machines such as centrifugal gas compressors. Installing magnetic bearings in a centrifugal gas compressor may accomplish both desires. Centrifugal gas compressors may achieve greater efficiencies with magnetic bearings by eliminating any contact between the bearings and rotary element. Contact between the bearings and the rotary element generally causes frictional losses to occur. Magnetic bearings may use electromagnetic forces to levitate and support the rotary element without physically contacting the rotary, element eliminating the frictional losses.

Using magnetic bearings may reduce or eliminate production of undesirable emissions. These emissions may be produced by leaking or burning a lubricant such as oil. Eliminating the contact and frictional losses between the rotary element and bearings by supporting the rotary element with magnetic bearings may eliminate or reduce the need for lubricants in centrifugal gas compressors. With this elimination or reduction of lubricants or oil, the emissions in centrifugal gas compressors may be reduced or eliminated. Eliminating lubricants may also eliminate the need for the valves, pumps, filters, and coolers associated with lubrication systems.

In centrifugal gas compressor 100, the magnetic bearing system supports shaft 120 with suction end radial bearing 125 and discharge end radial bearing 195, and counteracts axial forces with thrust bearing 160. Suction end radial bearing 125, discharge end radial bearing 195, and thrust bearing 160 use electromagnets that include windings or coils to produce a magnetic field. The magnetic field is generated by the electrical currents traversing the windings or coils. The magnetic forces generated by the windings and coils may be controlled by varying the electric current traversing the windings and coils.

The magnetic field produced by the windings of suction end radial bearing 125 and discharge end radial bearing 195 may interact with the ferromagnetic materials of suction end lamination 127 and a discharge end lamination to levitate shaft 120 without any contact between the windings and the laminations. The magnetic coils of forward bearing pole 172 and aft bearing pole 174 may interact with the ferromagnetic materials of thrust collar 161 to counteract the axial forces applied to shaft 120 without thrust collar 161 contacting either forward bearing pole 172 or aft bearing pole 174.

The specific load capacity of a magnetic bearing thrust collar, such as thrust collar 161, may be less than the specific load capacity of a mechanical bearing thrust collar. The diameter of a magnetic thrust collar may need to be larger than that of a mechanical thrust collar to have an equivalent thrust capacity. Hydraulic mounting of magnetic thrust collars may limit the outer diameter of the thrust collar due to high stresses that may occur during the hydraulic installation of the magnetic thrust collars. The stiffness of a center disk such as central disk 162 may contribute to the stresses occurring during hydraulic installation of the magnetic thrust collars onto a centrifugal gas compressor shaft.

It was determined through research and development that thrust collar 161 with forward wing 163 and aft wing 164 may be thermally installed onto shaft 120, which may reduce the stresses associated with installation of thrust collar 161. Forward mounting pilot 165 is the point of contact of forward wing 163 with shaft 120. Aft mounting pilot 167 is the point of contact of aft wing 164 with shaft 120. Any contact between forward mounting pilot 165 and shaft 120, or aft mounting pilot 167 and shaft 120 during installation will deflect forward mounting pilot 165 or aft mounting pilot 167 radially outward. The relatively thin hollow cylindrical shapes of forward wing 163 and aft wing 164 as compared to central disk 162 may have a lighter stiffness, which may reduce the stresses within thrust collar 161 during installation of thrust collar 161. The reduction of stresses during the installation of thrust collar 161 may permit the use of a larger outer diameter for central disk 162.

The steps in shaft 120 along with first region 115, second region 116, third region 117, fourth region 118, and fifth region 119 may facilitate installation of thrust collar 161. After thrust collar 161 is heated, forward mounting pilot 165 may radially clear first region 115 and the first step. Forward mounting pilot 165 may have a temporary radial clearance with second region 116 and axially align with region 116. Forward mounting pilot 165 may not radially clear second the step to help align forward mounting pilot 165 with second region 116. Aft mounting pilot 167 may radially clear first region 115, the first step, second region 116, the second step, third region 117, and the third step. Aft mounting pilot 167 may not radially clear the fourth step which may help align aft mounting pilot 167 with fourth region 118. This may help ensure that forward mounting pilot 165 and aft mounting pilot 167 each contact shaft 120 at the same time and that one of the mounting pilots does not bind before the other.

Threaded region 166 is a threaded portion of forward wing 163. The threads may allow a removal tool to be coupled to thrust collar 161, which may facilitate removal of thrust collar 161 from shaft 120.

The preceding detailed description is merely exemplary in nature and is not intended to limit the invention or the application and uses of the invention. The described embodiments are not limited to use in conjunction with a particular type of gas compressor. Hence, although the present embodiments are, for convenience of explanation, depicted and described as being implemented in a centrifugal gas compressor, it will be appreciated that it can be implemented in various other types of compressors, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A centrifugal gas compressor, comprising:
    a shaft extending from a discharge end to a suction end;
    a thrust collar mounted to the shaft, the thrust collar having
        a central disk, the central disk being a disk shaped hollow cylinder with a central axis,
        a forward wing, the forward wing being a thin walled hollow cylinder extending axially from an inner portion of the central disk about the central axis, and
        an aft wing, the aft wing being a thin walled hollow cylinder extending axially from the inner portion of the central disk about the central axis in a direction opposite the forward wing,
        the central disk, the forward wing, and the aft wing are configured to form a shaft cavity extending along the central axis, the shaft cavity having an inner surface,
        wherein a forward mounting pilot protrudes radially inward beyond the inner surface proximal an end of the forward wing distal to the central disk, contacting the shaft, and an aft mounting pilot protrudes radially inward beyond the inner surface proximal an end of the aft wing distal to the central disk, contacting the shaft; and
    a magnetic bearing having
        a forward bearing pole located axially forward of the central disk with a forward axial clearance there between and radially outward from the shaft with a radial clearance there between; and
        an aft bearing pole located axially aft of the central disk with an aft axial clearance there between and radially outward from the shaft with a radial clearance there between.

2. The centrifugal gas compressor of claim 1, further comprising:
    the shaft having
        a first region,
        a second region axially aft of the first region with a first step there between, the second region outside diameter being larger than the first region outside diameter,
        a third region axially aft of the second region with a second step there between, the third region outside diameter being larger than the second region outside diameter,
        a fourth region axially aft of the third region with a third step there between, the fourth region outside diameter being larger than the third region outside diameter, and
        a fifth region axially aft of the fourth region with a fourth step there between, the fifth region outside diameter being larger than the fourth region outside diameter;
    wherein the forward mounting pilot axially aligns with the second region between the first step and the second step, and the aft mounting pilot axially aligns with the fourth region between the third step and the fourth step.

3. The centrifugal gas compressor of claim 2, wherein the inner surface axially aligns with the third region, the inner surface and the third region being configured with a radial gap there between.

4. The centrifugal gas compressor of claim 2, wherein the thrust collar is installed onto the shaft with an interference fit between the forward mounting pilot and the second region, and the aft mounting pilot and the fourth region.

5. The centrifugal gas compressor of claim 1, wherein the thrust collar is installed onto the shaft with an interference fit.

6. The centrifugal gas compressor of claim 1, wherein the central disk, the forward wing, and the aft wing are a single piece forging.

7. The centrifugal gas compressor of claim 1, wherein the central disk includes ferromagnetic materials.

8. A magnetic bearing system comprising:
    a thrust collar having
        a central disk, the central disk being a disk shaped hollow cylinder with a central axis,
        a forward wing, the forward wing being a thin walled hollow cylinder extending axially from an inner portion of the central disk about the central axis, the forward wing including
            a forward mounting pilot extending radially inward from the forward wing proximal an end of the forward wing distal to the central disk, wherein the forward mounting pilot is configured to contact a centrifugal gas compressor shaft when installed in a centrifugal gas compressor,
        an aft wing, the aft wing being a thin walled hollow cylinder extending axially from the inner portion of the central disk about the central axis in a direction opposite the forward wing, the aft wing having
            an aft mounting pilot extending radially inward from the aft wing proximal an end of the aft wing distal to the central disk, wherein the aft mounting pilot is configured to contact the centrifugal gas compressor shaft when installed in the centrifugal gas compressor, wherein the thrust collar includes ferromagnetic materials;
a forward bearing pole located axially forward of the central disk with a forward axial clearance there between, the forward bearing pole having
a forward circumferential slot proximal the central disk; and
an aft bearing pole located axially aft of the central disk with an aft axial clearance there between, the aft bearing pole having
an aft circumferential slot proximal the central disk.

9. The magnetic bearing system of claim 8, wherein the forward circumferential slot and the aft circumferential slot each include magnetic coils.

10. The magnetic bearing system of claim 8, wherein the central disk, the forward wing, and the aft wing are a single piece forging.

11. The magnetic bearing system of claim 8, wherein the central disk, the forward wing, and the aft wing are configured to form a shaft cavity.

12. The magnetic bearing system of claim 11, further comprising a shaft, wherein the thrust collar is installed onto the shaft with the shaft passing through the shaft cavity, the shaft having an interference fit with the forward mounting pilot and with the aft mounting pilot.

13. A magnetic bearing thrust collar, comprising:
a central disk, the central disk being a disk shaped hollow cylinder with a central axis;
a forward wing, the forward wing being a thin walled hollow cylinder extending axially from an inner portion of the central disk about the central axis, the forward wing having
a forward mounting pilot extending radially inward from the forward wing proximal an end of the forward wing distal to the central disk;
an aft wing, the aft wing being a thin walled hollow cylinder extending axially from the inner portion of the central disk about the central axis in a direction opposite the forward wing, the aft wing having
an aft mounting pilot extending radially inward from the aft wing proximal an end of the aft wing distal to the central disk.

14. The thrust collar of claim 13, wherein the central disk, the forward wing, and the aft wing are configured to form a shaft cavity.

15. The thrust collar of claim 13, wherein the forward wing has a threaded region located at an outer surface of the forward wing, distal to the central disk, and radially outward from the forward mounting pilot.

16. The thrust collar of claim 13, wherein the central disk includes multiple axial thicknesses.

17. The thrust collar of claim 16, wherein the central disk includes a first disk portion and a third disk portion, the first disk portion being a radially inner portion of the central disk and the third disk portion being a radially outer portion of the central disk with the first disk portion being axially thicker than the third disk portion.

18. The thrust collar of claim 17, wherein the central disk includes a second disk portion, the second disk portion being located radially between the first disk portion and the third disk portion with the first disk portion being axially thicker than the second disk portion and the second disk portion being axially thicker than the third disk portion.

19. The thrust collar of claim 13, wherein the central disk, the forward wing, and the aft wing are a single piece forging.

20. A centrifugal gas compressor including the thrust collar of claim 13, wherein the thrust collar is installed onto a shaft with an interference fit.

* * * * *